Patented Nov. 12, 1940

2,221,131

UNITED STATES PATENT OFFICE 2,221,131

NITRO-DYESTUFFS AND PROCESS OF PREPARING THEM

Erich Fischer and Walter Gmelin, Bad Soden in Taunus, Richard Huss, Frankfort-on-the-Main-Hochst, and Hans Krzikalla and Heinz Pardon, Ludwigshafen-on-the-Rhine, Germany, assignors to General Aniline & Film Corporation, a corporation of Delaware No Drawing. Application April 30, 1937, Serial No. 140,068. In Germany May 2, 1936

8 Claims. (Cl. 260—507)

The present invention relates to nitro-dyestuffs and to a process of preparing them; more particularly it relates to compounds of the following general formula:

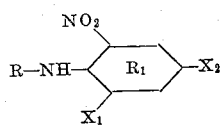

wherein R stands for a radical of the benzene series, $X_1$ and $X_2$ stand for hydrogen, $NO_2$, COOH, COO.alkyl, $CO.NH_2$, CO.N(alkyl)$_2$, $SO_3H$, $SO_2.NH_2$, $SO_2.N$(alkyl)$_2$, $CH_2.COOH$ or $CH_2.SO_3H$, and wherein at least one of the radicals R and $R_1$ contains at least one alkyl-$SO_3H$ or alkyl-COOH group.

We have found that valuable nitro-dyestuffs soluble in water are obtainable by condensing an aromatic amine with a nitro compound of the aromatic series containing an exchangeable halogen, nitro or alkoxy group, at least one of the components containing one or more alkyl-$SO_3H$ or alkyl-COOH groups.

The dyestuffs obtained are distinguished by good fastness properties and are especially suitable for dyeing leather.

The condensation is conducted in water or in an organic solvent or in a mixture of both according to known methods. The reaction may be performed by heating in a reflux apparatus or under raised pressure.

The following examples serve to illustrate the invention, but they are not intended to limit it thereto; the parts are by weight, unless otherwise stated:

(1) The combined aqueous solutions of 316 parts of sodium 4'-methoxy-4-amino-diphenylamine-2-sulfonate and 335 parts of potassium 1-chloro-2,6-dinitro-4-benzyl-sulfonate are kept boiling under reflux for some hours, in the presence of sodium acetate. The dyestuff is separated from the clear solution by addition of sodium chloride; after filtering with suction, it may be recrystallized from water. The dyestuff dyes leather throughout brown tints. It is characterized by the following formula:

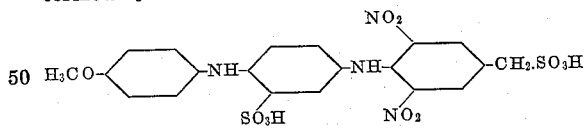

Dyestuffs having similar properties are obtained by exchanging the potassium 1-chloro-2,6-dinitro-4-benzyl-sulfonate for the same quantity of potassium 1-chloro-4,6-dinitro-2-benzyl-sulfonate, or for 283 parts of the sodium salt of 1-chloro-2,6-dinitro-4-benzyl-carboxylic acid or the sodium salt of 1-chloro-4,6-dinitro-2-benzyl-carboxylic acid.

(2) When 210 parts of sodium 1,4-diaminobenzene-2-sulfonate are substituted for the sodium 4'-methoxy-4-amino-diphenylamine-2-sulfonate mentioned in Example 1, dyestuffs having similar properties are obtained.

(3) 187 parts of 4-amino-1-benzyl-sulfonic acid dissolved in water are neutralized by means of sodium carbonate and heated for 5 hours with 203 parts of 2,4-dinitro-1-chlorobenzene in the presence of 136 parts of crystallized sodium acetate, at 90° C.-100° C. After cooling, a yellow condensation product crystallizes; it is filtered with suction and washed with a saturated sodium chloride solution. The dyestuff dyes leather very even yellow tints.

If the 2,4-dinitro-1-chlorobenzene is replaced by o-dinitrobenzene and the condensation is conducted in a closed vessel at about 130° C., a dyestuff of similar properties is obtained.

(4) In a manner analogous to that described in the foregoing examples, a yellow dyestuff dyeing the leather throughout is obtained by condensation of 239 parts of sodium 4-methoxy-3-amino-1-benzyl-sulfonate with 335 parts of potassium 1-chloro-2,6-dinitro-4-benzyl-sulfonate.

(5) 230 parts of 4-aminophenyl-1-methyl-taurine of the formula:

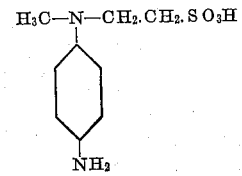

are neutralized in a small amount of water by means of sodium carbonate and then heated at 80° C.-90° C. for about 5 hours with 247 parts of 2-methoxy-3,5-dinitro-1-benzoic acid, in the presence of 272 parts of crystallized sodium acetate. The condensation is quickly completed. On cooling, the dyestuff crystallizes and is then completely separated by means of sodium chloride. It is a brown powder which dissolves easily in water to a yellow-brown solution. According to the usual methods, the dyestuff dyes leather throughout even yellow-brown tints.

Dyestuffs having similar properties are obtained by exchanging the 4-aminophenyl-1- methyltaurine for 151 parts of 4-aminophenyl-acetic acid, 216 parts of 4-amino-phenyltaurine or for 324 parts of a compound having the following constitution:

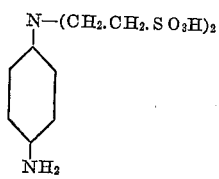

Dyestuffs of similar properties may also be obtained by replacing the 2-methoxy-3,5-dinitro-1-benzoic acid by equivalent amounts of the following nitro-compounds:

2-chloro-3,5-dinitro-1-benzoic acid methyl ester,
1-chloro - 2,6 - dinitrobenzene - 4-carboxylic acid ethyl ester,
1-chloro-2,6-dinitrobenzene-4-carboxylic acid amide,
1-chloro-2,6-dinitrobenzene-4-carboxylic acid dimethylamide or diethylamide,
1-chloro-4,6-dinitrobenzene-2-carboxylic acid amide,
1-chloro-4,6-dinitrobenzene-2-carboxylic acid dimethylamide or diethylamide,
1-chloro-2,6-dinitrobenzene-4-sulfamide or
1-chloro-2,6-dinitrobenzene-4-sulfonic acid dimethylamide or diethylamide.

(6) When 248 parts of picryl chloride are substituted for the 2-methoxy-3,5-dinitro-1-benzoic acid used in Example 5, dyestuffs are obtained which dye leather throughout reddish-brown tints. The dyestuff product has the formula

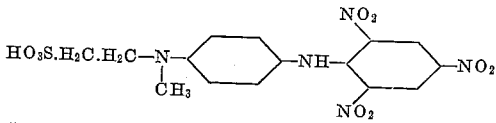

(7) If there are used, instead of the methoxy-dinitro-benzoic acid mentioned in Example 5, 321 parts of potassium 1-chloro-2,6-dinitrobenzene-4-sulfonate, the same quantity of potassium 1-chloro-4,6-dinitrobenzene-2-sulfonate or 286 parts of the potassium salt of 1-chloro-2,6-dinitrobenzene-4-carboxylic acid, dyestuffs are obtained which dye leather throughout brown tints. The dyestuff product derived from potassium 1-chloro-2,6-dinitrobenzene-4-sulfonate has the formula

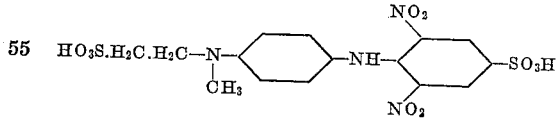

and the dyestuff product derived from the potassium salt of 1-chloro-2,6-dinitrobenzene-4-carboxylic acid has the formula

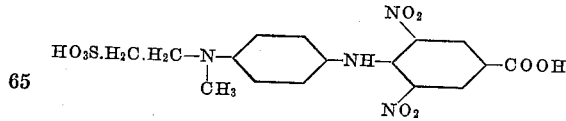

(8) In a manner analogous to that described in the preceding examples, dyestuffs which dye leather throughout brown tints are obtained by condensation of 3,5-dinitro-2-chloro-benzoic acid with N - butyl-(4-amino-3-methylphenyl-)taurine, N-butyl-(4-aminophenyl-)taurine or N-ethyl-(4-amino-3-methylphenyl-)taurine.

(9) 18.7 parts of 4-amino-1-benzylsulfonic acid are diazotized, at 0° C.–5° C., with 6.9 parts of sodium nitrite, in the presence of hydrochloric acid in excess. The diazo-solution obtained is caused to run slowly into an aqueous solution of 10.8 parts of 1,3-diaminobenzene rendered feebly acid by means of a mineral acid. By cautious addition of an aqueous sodium acetate solution, the reaction is permanently kept feebly acid to Congo paper. After some hours, the formation of the mono-azo-dyestuff is complete. The dyestuff is then isolated, suspended in 500 parts by volume of water and dissolved, in the form of its sodium salt, with the calculated amount of sodium carbonate. 15 parts of crystallized sodium acetate and 31 parts of sodium 1-chloro-2,6-dinitrobenzene-4-sulfonate in an aqueous solution are then added and the mixture is heated, for 8 hours, at 145° C. in an autoclave. From the brown solution obtained the condensation product is separated as usual. The dyestuff dyes leather brown tints.

(10) 30.5 parts of the mono-azo-dyestuff, obtainable by coupling diazotized 4-amino-1-benzyl-sulfonic acid with 1-amino-3-methylbenzene in a medium being feebly acid to Congo paper, are suspended in 300 parts by volume of water and dissolved by addition of sodium carbonate. 15 parts of crystallized sodium acetate and a neutral aqueous solution of 27.2 parts of the sodium salt of 1-chloro-2,6-dinitrobenzene-4-carboxylic acid are then added to the neutral solution obtained. Thereupon, the mixture is heated to boiling under reflux, until the condensation is complete. The dyestuff thus obtained dyes leather orange-yellow tints.

When the 1-chloro-2,6-dinitrobenzene-4-carboxylic acid is exchanged for the 4-chloro-3,5-dinitro-1-benzyl-carboxylic acid, a dyestuff having similar properties is obtained.

(11) 166 parts of 3-amino-phenylglycine are transformed, by means of sodium carbonate, into the sodium salt and then heated at 90° C.–100° C. with 321 parts of potassium 1-chloro-2,6-dinitrobenzene-4-sulfonate, for 5 hours, while adding 136 parts of sodium acetate. The condensation product is separated by addition of salt. It is a dark brown powder which dissolves easily in water to a brown solution and dyes leather throughout brown tints.

(12) 29.1 parts of the mono-azo-dyestuff, obtainable by coupling diazotized sulfanilic acid with 1-amino-3-methylbenzene in a medium being feebly acid to Congo, are dissolved in the form of the sodium salt in water, while adding sodium carbonate. An aqueous solution of 33.5 parts of potassium 1-chloro-2,6-dinitro-4-benzylsulfonate and 15 parts of crystallized sodium acetate are added thereto and the whole is heated to boiling for some hours in the reflux apparatus. The dyestuff is worked up in the usual manner. It dyes leather yellow tints.

We claim:
1. The nitro-dyestuffs of the following general formula

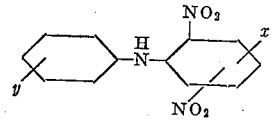

wherein $x$ is a substituent of the group consisting of hydrogen, —$NO_2$, —$SO_3H$, —COOH, —alkyl $SO_3H$ and —alkyl COOH, and $y$ is a substituent of the group consisting of —alkyl $SO_3H$, —alkyl COOH, —N—alkyl $SO_3H$ and —N—alkyl COOH, being yellow to brown powders penetrating deeply into leather and yielding yellow to brown tints.

2. Process of preparing a nitro-dyestuff which comprises condensing, in the presence of an acid-binding agent and a solvent, a compound of the formula

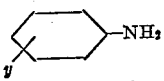

wherein $y$ represents a substituent of the group consisting of —alkyl $SO_3H$, —alkyl COOH, —N—alkyl $SO_3H$ and —N—alkyl COOH with a compound of the formula

wherein $x$ is a substituent of the group consisting of hydrogen —$NO_2$, —$SO_3H$, —COOH, —alkyl $SO_3H$ and —alkyl COOH, and $z$ is an exchangeable substituent of the group consisting of halogen and alkoxy.

3. A process of preparing a nitro-dyestuff which comprises condensing in the presence of an acid-binding agent and a solvent 4-aminophenyl-1-methyltaurine with picrylchloride.

4. A process of preparing a nitro-dyestuff which comprises condensing in the presence of an acid-binding agent and a solvent 4-aminophenyl-1-methyltaurine with 1-chloro-2,6-dinitrobenzene-4-sulfonic acid.

5. A process of preparing a nitro-dyestuff which comprises condensing in the presence of an acid-binding agent and a solvent 4-aminophenyl-1-methyltaurine with 1-chloro-2,6-dinitrobenzene-4-carboxylic acid.

6. The nitro-dyestuff of the following formula:

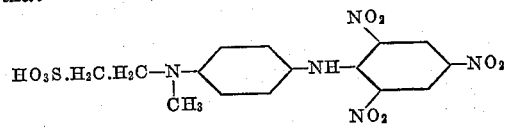

being a brown powder which dyes leather throughout reddish-brown tints.

7. The nitro-dyestuff of the following formula:

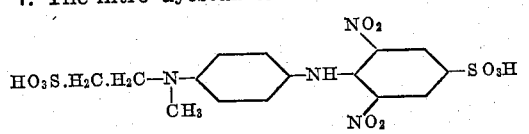

being a brown powder which dyes leather throughout brown tints.

8. The nitro-dyestuff of the following formula:

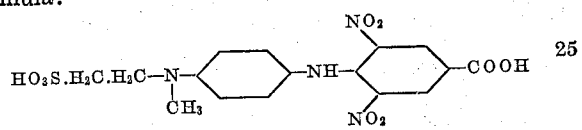

being a brown powder which dyes leather throughout brown tints.

ERICH FISCHER.
WALTER GMELIN.
RICHARD HUSS.
HANS KRZIKALLA.
HEINZ PARDON.